(No Model.)

A. H. HETTICH.
TILE FLOORING.

No. 533,807. Patented Feb. 5, 1895.

Witnesses:

Inventor:
Albert H. Hettich
By Dyrenforth & Dyrenforth,
Attys

UNITED STATES PATENT OFFICE.

ALBERT H. HETTICH, OF CHICAGO, ILLINOIS.

TILE FLOORING.

SPECIFICATION forming part of Letters Patent No. 533,807, dated February 5, 1895.

Application filed November 10, 1894. Serial No. 528,358. (No model.)

*To all whom it may concern:*

Be it known that I, ALBERT H. HETTICH, a citizen of the United States, residing at Chicago, in the county of Cook and State of Illinois, have invented a new and useful Improvement in Tile Flooring, of which the following is a specification.

The common mode of laying tiles is to apply them on a bed of cement and, when they have been tamped down to the desired evenness of surface, the surface is covered with a liquid cement for the purpose of enabling the latter to percolate into the joints between the tiles there to cement them together. Before the cement hardens upon the surface of the tile floor it is removed by washing or brushing it off, with sand or other suitable agent. Thus the supply of liquid cement to the joints must be removed within a comparatively short time, after its application to the floor-surface—that is, before it sets; and experience shows that where, in places at the joints, air or water bubbles form in them, requiring greater time to be supplanted by the percolation of the liquid cement, the time which it is permissible to allow the supply of cement to remain on the floor-surface is insufficient, so that these bubbles leave spaces at which there is no cementation. To overcome this difficulty, which is the object of my improvement, I form each tile, whatever may be its shape, with beveled upper edges, whereby when the tiles are laid they will form, at their junctions, troughs. These troughs hold the supply of liquid cement in a comparatively great quantity over each joint, thus facilitating the percolation and enhancing its power of overcoming the resistance of the bubbles to be supplanted, besides, owing to the accumulated form of the liquid cement in the troughs, in contradistinction to the thinner or spread-condition thereof on the other parts of the floor-surface, setting the less quickly; so that, by the exercise of reasonable care, the surface-cement may be removed in time without removing the cement in the troughs, which may be allowed to remain considerably longer without danger of its becoming too hard for convenient removal. In this manner I am enabled to produce thorough cementation between the tiles and, moreover, to lay them as closely together as possible, whereas it is now usual to set them a sufficient distance apart to facilitate filling the joints with the liquid cement, which is objectionable as the farther apart the tiles are laid the less solid is the floor.

My improvement is illustrated in the accompanying drawings, in which—

Figure 1:
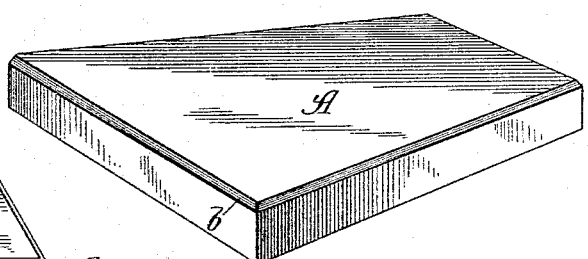
Figure 2:
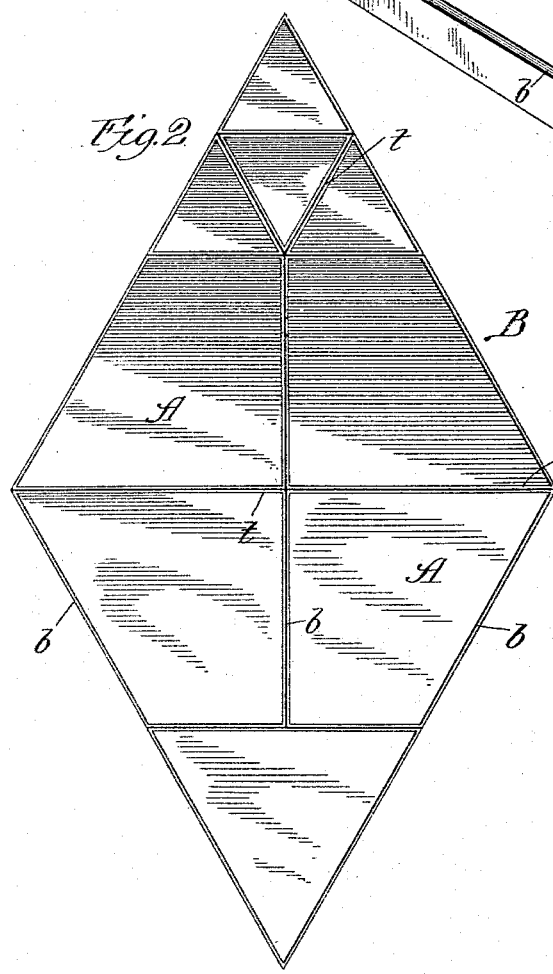
Figure 3:
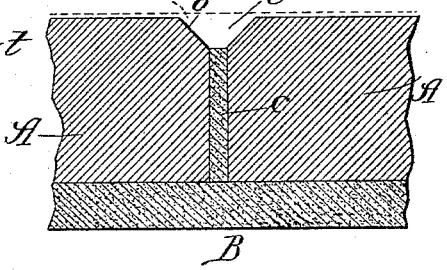

Figure 1 is a perspective view of a tile formed with beveled edges; Fig. 2, a plan view of a section of tile-floor showing the troughs formed at the joints between tiles; and Fig. 3 a section taken at the line 3 on Fig. 2 and viewed in the direction of the arrow.

A is a tile of any usual or suitable variety and shape. The edges of the tile are beveled, as indicated at $b$, the bevel being at any desired degree of inclination, provided there be left a sufficient surface on the tile below the outer end of each bevel for cementation between tiles. A floor B, laid with the tiles A, (and they may, with advantage, be laid as closely together as possible) has formed, by the beveled edges at the joints, troughs $t$. Cement $c$ in liquid form, flushed over or otherwise applied to the floor, fills the troughs or pockets $t$, which thus contain the supply which percolates between the joints to effect the cementation of the tiles. The liquid cement on the surface afforded by the flat portions of the tiles may be removed in the usual or any suitable manner at any time before it becomes too hard, without disturbing, or materially disturbing, the contents of the troughs, which may remain till they have overcome all resistance to percolation into the joint-spaces between the tiles, after which the contents of the troughs may be removed.

What I claim as new, and desire to secure by Letters Patent, is—

The method of forming a tile floor, which consists in laying the tiles in suitable relation to each other and providing troughs at their joints, and supplying liquid cement in the troughs to enter therefrom between the joints, substantially as and for the purpose set forth.

ALBERT H. HETTICH.

In presence of—
J. N. HANSON,
I. H. LEE.